US008332476B2

(12) United States Patent
Abramson et al.

(10) Patent No.: US 8,332,476 B2
(45) Date of Patent: Dec. 11, 2012

(54) SOCIAL NETWORK VIRTUAL PRIVATE NETWORK

(75) Inventors: Sandra Abramson, Freehold, NJ (US); Raj Sinha, West Orange, NJ (US)

(73) Assignee: Avaya Inc., Basking Ridge, NJ (US)

( * ) Notice: Subject to any disclaimer, the term of this patent is extended or adjusted under 35 U.S.C. 154(b) by 243 days.

(21) Appl. No.: 12/837,207

(22) Filed: Jul. 15, 2010

(65) Prior Publication Data

US 2011/0047229 A1 Feb. 24, 2011

Related U.S. Application Data

(60) Provisional application No. 61/235,838, filed on Aug. 21, 2009.

(51) Int. Cl.
*G06F 15/16* (2006.01)
*G06F 17/30* (2006.01)
(52) U.S. Cl. .................. 709/206; 709/205; 709/218
(58) Field of Classification Search .................. 709/206, 709/204, 205, 217–218, 248; 715/733–759, 715/853, 201, 700
See application file for complete search history.

(56) References Cited

U.S. PATENT DOCUMENTS

| 7,478,129 | B1 | 1/2009 | Chemtob |
| 7,802,290 | B1 * | 9/2010 | Bansal et al. ............. 726/3 |
| 7,958,192 | B2 * | 6/2011 | Harik et al. ............ 709/204 |
| 2007/0255807 | A1 | 11/2007 | Hayashi et al. |
| 2008/0104495 | A1 | 5/2008 | Craig |
| 2008/0134035 | A1 * | 6/2008 | Pennington et al. ...... 715/713 |
| 2009/0248392 | A1 * | 10/2009 | Talwar et al. .............. 704/3 |
| 2009/0271247 | A1 * | 10/2009 | Karelin et al. ........... 705/10 |
| 2010/0217720 | A1 * | 8/2010 | Jones et al. ............. 705/319 |
| 2010/0318925 | A1 * | 12/2010 | Sethi et al. ............. 715/760 |

OTHER PUBLICATIONS

Buchegger et al. "PeerSoN: P2P Social Networking: Early Experiences and Insights," ACM EuroSys Workshop on Social Network Systems, Apr. 7, 2009, 7 pages.
Figueiredo et al. "Social VPNs: Integrating Overlay and Social Networks for Seamless P2P Networking," IEEE Workshop on Enabling Technologies: Infrastructures for Collaborative Enterprises, WETICE '08, IEEE 17th. Jun. 23-25, 2008, pp. 93-98.
Juste et al. "On the Use of Social Networking Groups for Automatic Configuration of Virtual Grid Environments," IEEE Grid Computing Environments Workshop, 2008, (GCE '08), Nov. 12-16, 2008, pp. 1-10.
International Search Report for International (PCT) Patent Application No. PCT/US2010/044377, mailed Feb. 23, 2011 3 pages.
Written Opinion for International (PCT) Patent Application No. PCT/US2010/044377, mailed Feb. 23, 2011 3 pages.
International Preliminary Report on Patentability for International (PCT) Patent Application No. PCT/US2010/044377, mailed Mar. 1, 2012 8 pages.

* cited by examiner

*Primary Examiner* — Ruolei Zong
(74) *Attorney, Agent, or Firm* — Sheridan Ross P.C.

(57) ABSTRACT

A system and method create an interconnection among users of different social networks. Each user can provide information about the social networks they use (e.g., username, passwords, etc.). An application may register with the social network and can inter-dispose the application between the user and the social network. Then, the system can interconnect the users into a "virtual private network" (VPN) where communications between the users and the social networks can be replicated to other social networks for the other users. As such, different users using different social networks can communicate.

15 Claims, 8 Drawing Sheets

SOCIAL NETWORK VIRTUAL PRIVATE NETWORK

CROSS REFERENCE TO RELATED APPLICATIONS

This application claims the benefit of and priority under 35 U.S.C. §119(e) to U.S. Patent Application No. 61/235,838, filed Aug. 21, 2009, entitled "MOJO," which is incorporated herein by reference in its entirety.

BACKGROUND

Several social networks exist where people interact. However, a single user may use only one social network or prefer only one social network. Two different users may use or prefer different social networks. As such, using the social networks for communicating between two people can become untenable because the social networks do not interact. In other words, a user on one social network may not be able to communication with another user using a second, different social network.

SUMMARY

It is with respect to the above issues and other problems that the embodiments presented herein were contemplated. The embodiments presented herein create an interconnection among users of different social networks used by two or more users. Each user can provide information about the social networks they use (e.g., username, passwords, etc.). An application may register with the social network and can interdispose the application between the user and the social network. Then, the system can interconnect the users into a "virtual private network" (VPN) where communications between the users and the social networks can be replicated to other social networks for the other users. As such, different users using different social networks can communicate.

To accomplish the communications, the system or application may include an intercept module that intercepts communications to and from the social network. The intercepted communications may be translated by a translation module. The translation can change the communication from a format for a first social network into a second format for another social network. The communications may then be formatted for the different social networks by a format module. Finally, a present module can present the translated and formatted communications to the different social media network sites.

Thus, if a user uses Facebook, the user can post messages to his or her Facebook page. The system intercepts the posted message and replicates the message on a MySpace page for a second user. Likewise, a second user may post a reply on the MySpace page that can be intercepted, translated, formatted and presented on Facebook for the first user. Thus, the users can interact across different social media sites without needing to use a single site.

Alternative embodiments also can allow the VPN to control preferences or the functionality of the social media network site. In this way, the VPN can push the users into a "private chat" area of the social network. Thus, the VPN engine may allow the users to conduct private interactions also.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "in communication with" as used herein refers to any coupling, connection, or interaction using electrical signals to exchange information or data, using any system, hardware, software, protocol, or format.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the embodiments are considered to include a tangible storage medium and prior art-recognized equivalents and successor media, in which the software implementations are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the embodiments are described in terms of examples, it should be appreciated that individual aspects of the embodiments can be separately claimed.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
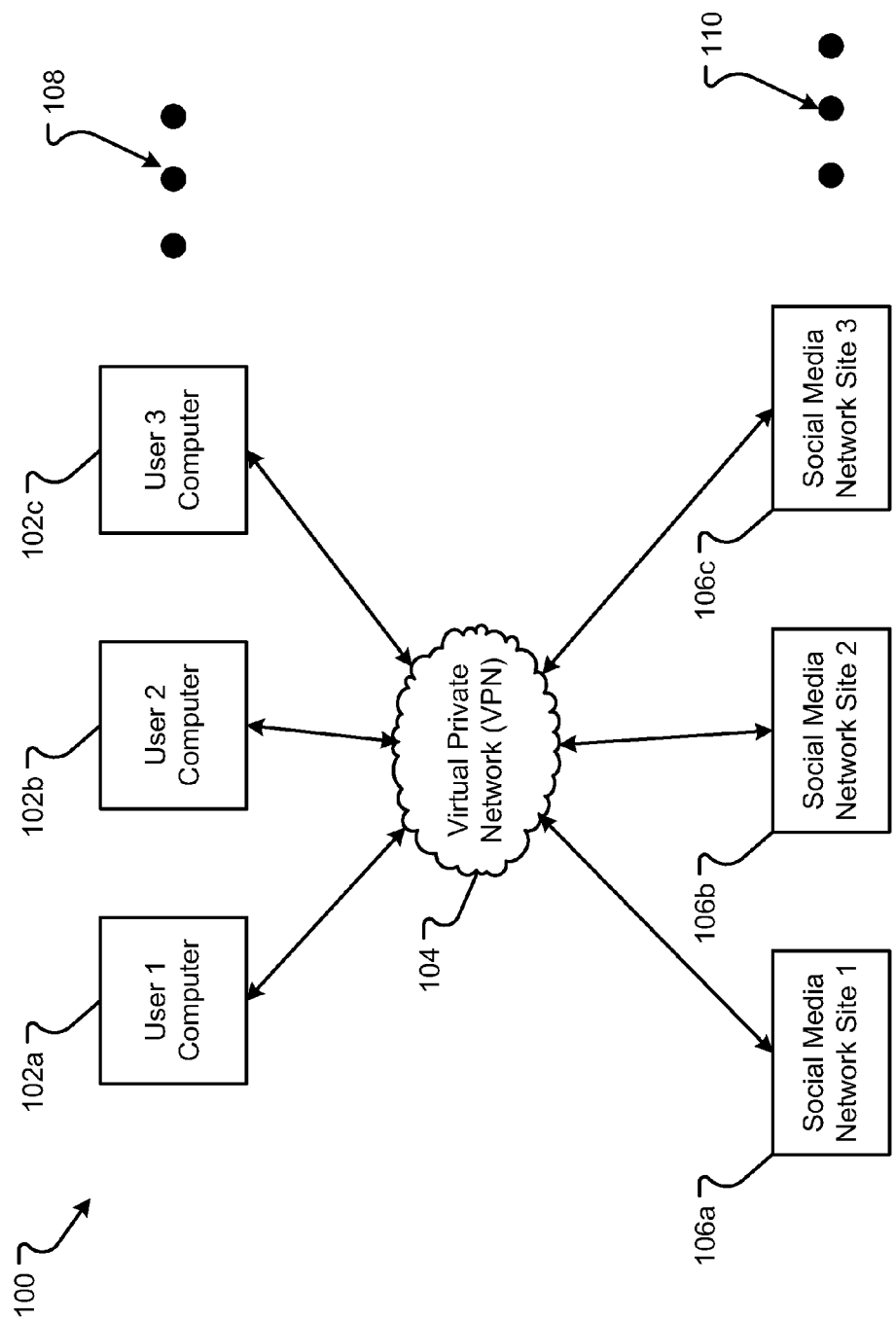
FIG. 1 is a block diagram of an embodiment of a VPN that links two or more social media networking sites.

An embodiment of a system 100 for creating a "virtual private network" (VPN) is shown in FIG. 1. A VPN can be any interconnection of two or more user computers 102, two or more social media network sites 106, and/or a system for sharing content among the two or more social media network sites 106. The system includes one or more users operating one or more user computers 102a, 102b, and/or 102c. Embodiments of the system 100 can include more or fewer user computers than those shown in FIG. 1, as represented by the ellipses 108. A user computer 102 can be any computing system as described in conjunction with FIG. 5 and FIG. 6. The users interact with social media networks through the user computers 102.

The users may interact with social media, such as social media network sites 1 106a, social media network site 2 106b, and/or social media network site 3 106c. Embodiments of the system 100 may include more or fewer social media, as represented by ellipses 110. A social media network site 106 or social media may be any website or system for providing a means of interaction between two or more people. For example, social media networks can include one or more of, but are not limited to, Facebook, MySpace, Spoke, Plaxo, LinkedIn, etc.

Each user executing user computer 102 may prefer one of the social media network sites 106. As such, a first user, using user computer 102a, may post content onto one of the social media networks 106a for one or more other users. However, one or more other users, using a second user computer 102b, may prefer a different social media network site 106b. When the first user wants to post content to their preferred social media network site 106a, the second user may not receive that content if they prefer or only use social media network site 106b. Thus, the system 100 provides a VPN 104 that can copy or share content among the different social media network sites 106. The VPN 104 can be created by one or more applications that are executed on user computers 102, on the social media network sites 106, or, possibly, on a third computer system (not shown).

Figure 2A:
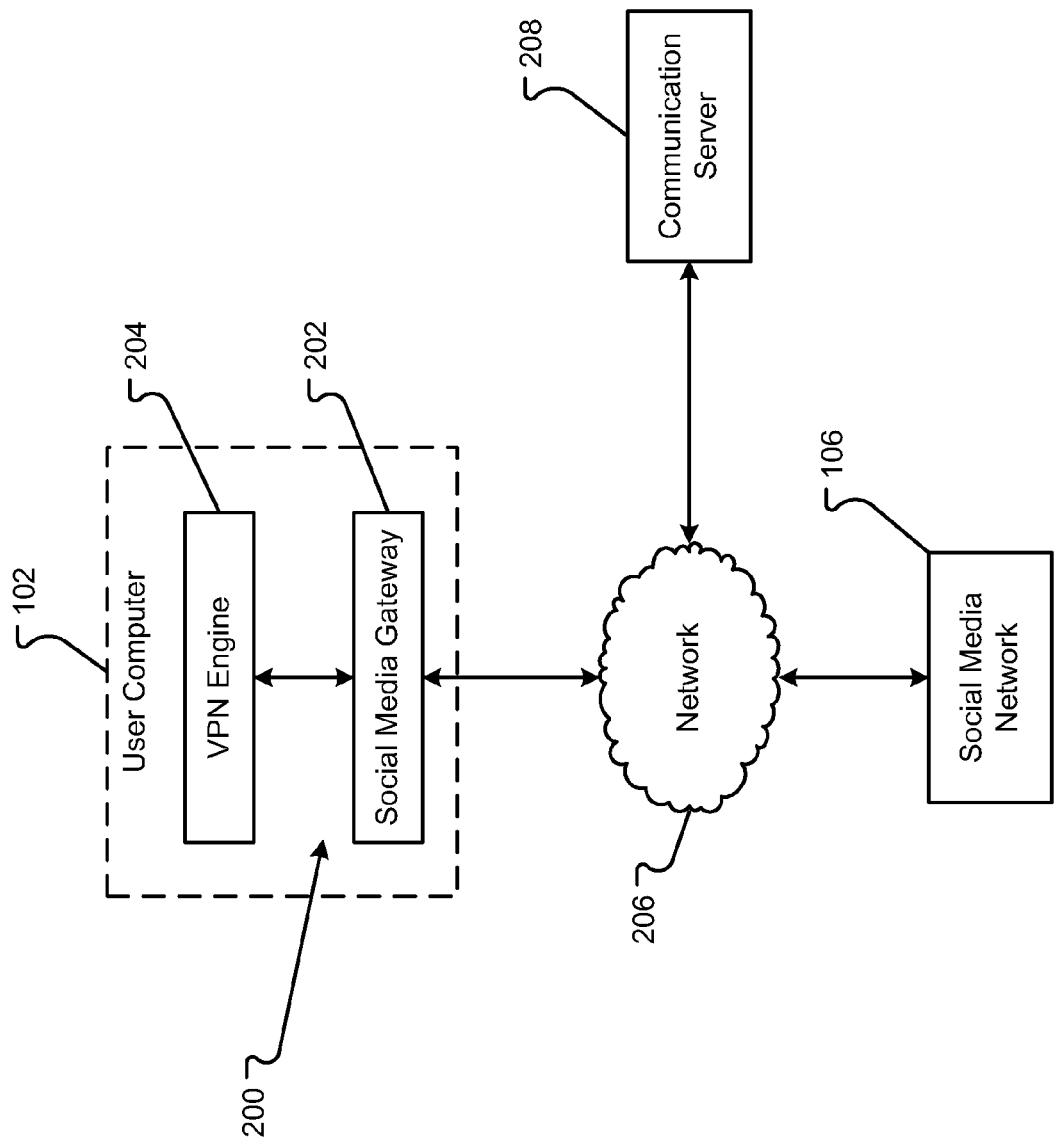
FIG. 2A is a block diagram of an embodiment of a user computer used to create the VPN.
Figure 2B:
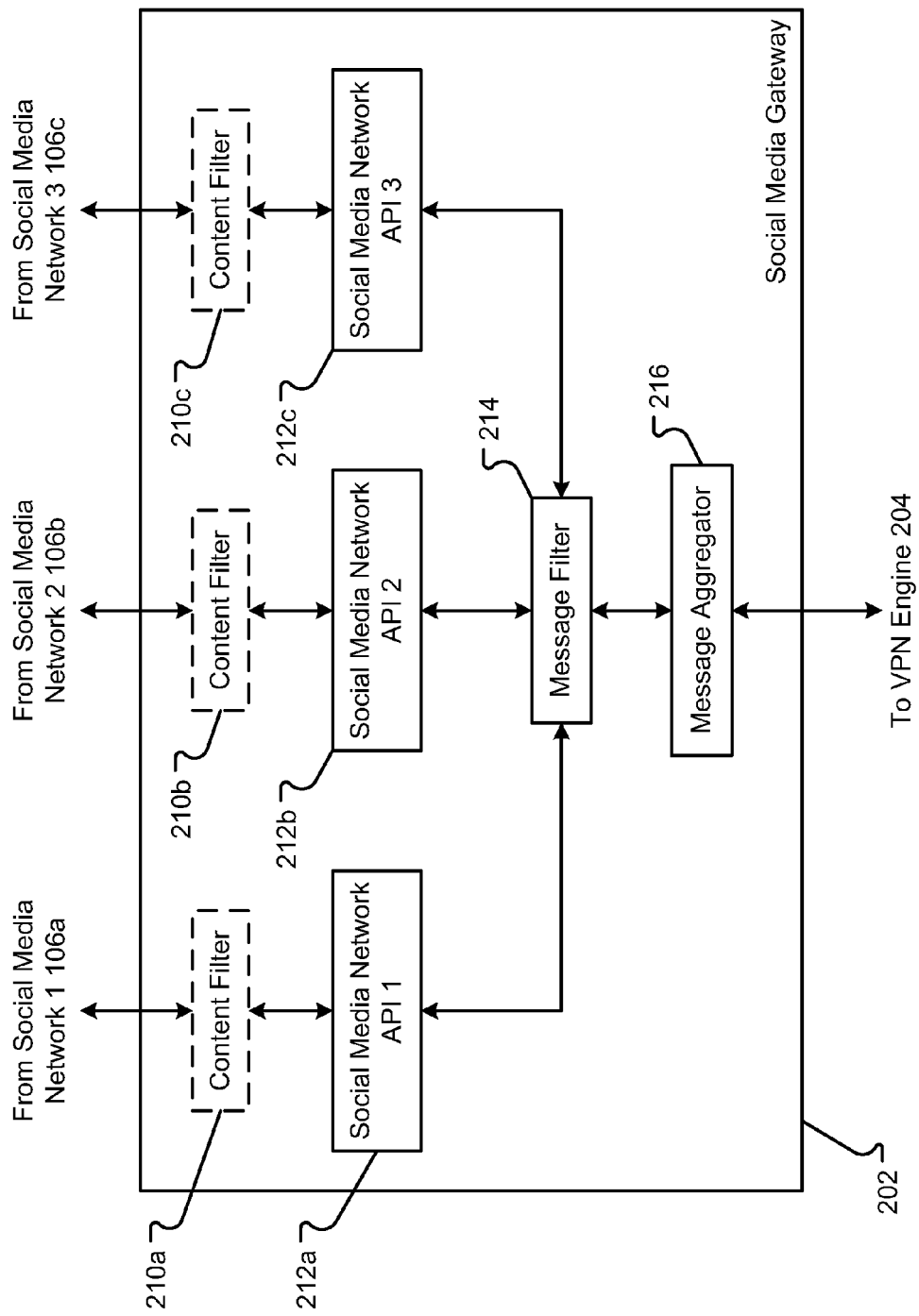
FIG. 2B is a block diagram of an embodiment of a social media gateway.
Figure 2C:
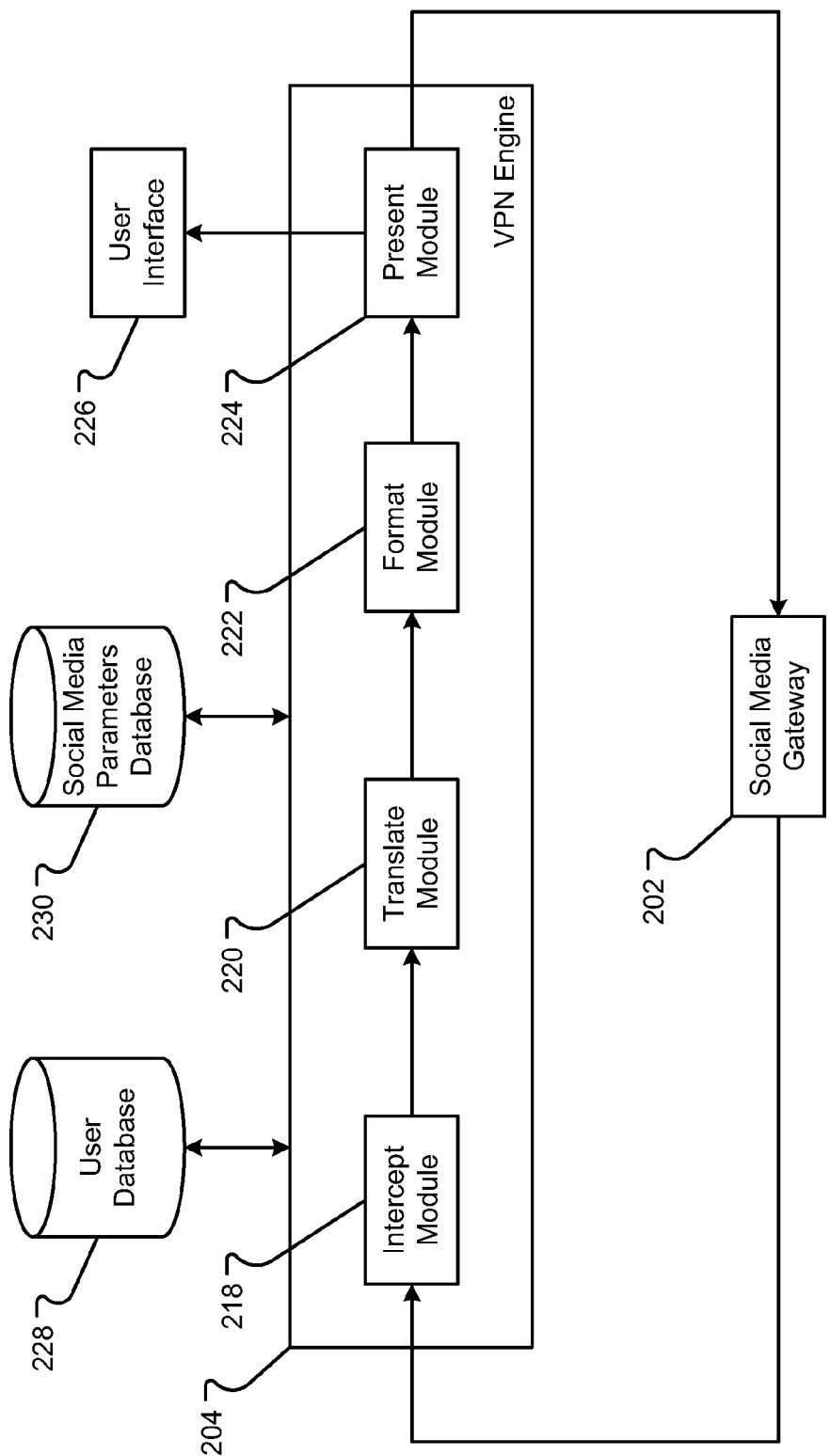
FIG. 2C is a block diagram of an embodiment of a VPN engine.

An embodiment of a software system 200 for creating the VPN is shown in FIGS. 2A through 2C. The software is shown as being executed on the user computer 102. However, as noted above, the software may, in some embodiments, be executed on the social media network sites 106 or on a third computer system. Here, each user computer 102 may interface with a social media network site 106 through a network 206. The network 206 can be any network, communication system, protocol, or other means of communicating, as described in conjunction with FIG. 5 and/or FIG. 6. The user computer 102 may also communicate with a communication server 208. The communication server 208 can be any server or computer system as described in conjunction with FIG. 5 and FIG. 6. The communication server 208 may be operable to provide communication services to the user computer 102.

The user computer 102 can execute one or more software components that can create the VPN. In embodiments, the modules or software to create the VPN can include a social media gateway 202 and a VPN engine 204. An embodiment of the social media gateway 202 is described in conjunction with FIG. 2(b). An embodiment of the VPN engine 204 is described in conjunction with FIG. 2(c).

An embodiment of the social media gateway 202 is shown in FIG. 2(b). The social media gateway 106 can include one or more components which may include hardware, software, or combination of hardware and software. The social media gateway 106 can be executed by a computer system such as those described in conjunction with FIGS. 5 and 6. However, in other embodiments, the components described in conjunction with FIG. 2B are logic circuits or other specially-designed hardware that are embodied in a field programmable gate array (FPGA).

Herein, the social media gateway 106 can include one or more content filters 210a, 210b, and/or 210c. A content filter 210 can receive all of the messages for a user computer 102 from a social media network site 106a, 106b, and/or 106c and eliminate or delete those messages that do not apply directly to the user. As such, the content filter 210 can filter out or delete messages so that the messages are not received by social media network application programming interface (API) 1 212a, social media network API 2 212b, and/or social media network API 3 212c. With the content filter 210, the social media network API 212 only needs to translate those messages that should be received by the VPN Engine 204. Translation typically requires the conversion of the message into a different format.

The content filter 210 is provided with one or more heuristics or filter rules from a filter database (not shown). These filter rules can be created by the user or an administrator of the communication system 101. Thus, the user or administrator of the communication system 101 can customize the filtering of messages from social media networks 106a, 106b, and/or 106c. Further, different rules may be applied to different social media networks, as some social media networks may have different types of messages or postings than other types of social media networks. The filtering may include filters based on the poster of social media content, keywords in the content, or other information.

While the content filter 210 is shown as part of the social media gateway 106, it is to be appreciated that the content filter 210 may be a part of the social media network API 212. The content filter 210 may correspond to the query terms used by the social media network API 212. The content filter 210 or query terms are an argument to the social media network API 212 call. The social media network API 212 can be an application that the social media network site 106a, 106b, and/or 106c provides to access the site. Thus, the social media network API 212 is called and connects the social media gateway 106 to the social media network site 106a, 106b, and/or 106c. Any suitable filter criteria may be employed. Examples include content of source, address field, destination or recipient address fields, time stamp field, subject matter field, and message body field. For example, searchable content is the name of the person for which a response may be sent.

The social media gateway 106 can include one or more social media network APIs 212. As shown in FIG. 2, the social media gateway 106 may include a social media network API 212 for each social media network site 106a, 106b, and/or 106c. As such, the social media gateway 106 can interact with each social media network site 106a, 106b, and/or 106c in the particular (often unique) format or protocol used by the social media network site 106a, 106b, and/or 106c. Further, when new social media networks are created, the social media gateway 106 can easily be expanded to interact with those social media networks by adding another social media network API 212. Where social media networks 106a are more standardized, or use substantially similar formats or protocols, a single social media network API can be shared by multiple such social media networks 106a-106c.

The social media network API 212 can receive messages from and send messages to the social media network site 106a, 106b, and/or 106c. In embodiments, the social media network API 212 may periodically search (e.g., once an hour, day, week, etc.) active social media for messages and automatically receive messages from passive social media. The social media network API 212 can translate a message received from a social media network site 106a, 106b, and/or 106c and send the translated message to a message filter 214. The social media network API 212 can translate the received message into a standard formatted file. For example, the translated message may be represented by an extensible mark-up language (XML) file or other file having a general format. As such, each specific and particular social media network message can be translated into a standard format for use by the VPN Engine 204. Further, the social media network API 212 can receive a generally or standard format response message, from the VPN Engine 204, and translate that response into a particularly or specifically formatted response message that can be posted to the corresponding social media network site 106a, 106b, and/or 106c.

Messages to the user are addressed to the user. For example, a person may become a "friend" of the user on a social media network site 106b, such as Facebook. The person may then address a message to the user on Facebook. This non-direct contact is a message that is not sent directly to the user but to the user's Facebook page. In other embodiments, the VPN engine 204 receives messages not addressed to the user. For example, the user can receive tweets from Twitter that are "broadcast" rather than addressed to the user. The VPN engine 204 may also search for messages or content on the social media network site 106a, 106b, and/or 106c. Exemplary search criteria include the user's name, user's home address, user's business address, user's employer name, user's educational or professional background, user's hobby, personal or business interests, user's family profile, and the like. Thus, the social media gateway 106 can query, gather, or connect to a live feed of data from a social media network site 106a, 106b, and/or 106c and then apply a filter to the indirect information.

The translated messages from the social media network API 212 can be received by a message filter 214. A message filter 214 can perform some or all of the functions of the content filter 210 and eliminate messages before being sent to the VPN Engine 204. Thus, the VPN Engine 204 receives a message where some of the content of the message has been deleted. The message filter 214 can retrieve heuristics or filter rules from a filter database (not shown), similar to the content filter 210. A substantial difference between the content and message filters 210 and 214 is that the content filter 210 is specific to a particular message format associated with a corresponding social media network site 106a-106c, while the message filter 214 is applied to a standardized or universal format and is therefore common to multiple social media networks 106a-106c. One skilled in the art will understand the type of rules that may be used to filter information from messages such that only pertinent questions, facts, requests, or information is sent to the VPN Engine 204.

A message aggregator 216 may also be included with the social media gateway 106. A message aggregator 216 can combine two or more messages into a packet or grouping that is sent to the VPN Engine 204. Therefore, the message aggregator 216 can inter-relate or combine messages based on different information within the messages. For example, two messages may be combined based on any of the message fields referenced above, such as the person that posted the message, the subject, the request or question asked, the person the message was sent to, or other information that may be pertinent to the VPN Engine 204. Thus, the VPN Engine 204 may be able to respond concurrently to two or more messages based on a grouping provided by the message aggregator 216. Regardless of whether the messages are aggregated, each message can be sent from the social media gateway 106 to the VPN Engine 204.

The social media gateway 106 can also send responses back to the social media networks 106a, 106b, and/or 106c. A response from the VPN Engine 204 can be sent to the social media gateway 202. The response may be in a general format and translated. The translated response may then be posted to the appropriate social media network site 106a, 106b, and/or 106c by the social media gateway 106. In other embodiments, the VPN Engine 204 may post the response directly to the social media network site 106a, 106b, and/or 106c without sending the response to the social media gateway 202.

The response may be sent to two or more social media networks 106 simultaneously to reach two or more users. Further, the social media gateway 202 may send a message to a particular social media network site 106 based on the identity of the recipient. For example, the recipient may be identified. From the identity, the social media gateway 202 may determine a social media network site 106 used by the recipient. Then, the social media gateway 202 can send the response directly to the recipient's social media network site 106.

An embodiment of the VPN engine 204 is shown in FIG. 2C. The VPN engine 204 is described as a software component or module but may be embodied in a logic circuit or other specially designed hardware that executes as part of the user computer 102. The VPN engine 204 can include one or more sub-modules, for example, the intercept module 218, the translate module 220, the format module 222, and the present module 224. The VPN engine 204 may also communicate with a user interface 226. The user interface 226 can be any interface that a user interacts with to either receive information from the user computer 102 or to input information into the user computer 102. The user interface 226 may be as explained in conjunction with FIG. 5 and FIG. 6.

An intercept module 218 is operable to intercept content being provided to a social media site 106. In embodiments, the intercept module 218 intercepts input to the memory stack of the processor of the user computer 102 if the input is associated with a posting to a social media site. For example, if the input is a message to be sent to a web address associated with a social media network site 106, the intercept module 218 can read the input, extract the input from the memory stack, and operate on the input before the content is posted. The input can be a user interface input from user interface 226 to the processor that includes content to be posted on a social media site 106. The intercept module can remove the input from the stack to be manipulated or changed.

In other embodiments, the intercept module 218 receives, from the social media gateway 202, the content to be posted to a social media site 106. As such, the social media gateway 202 sits or is inter-disposed between the user computer 102 and the social media networks 106. Any content going to or from a social media site 106 can be intercepted by the social media gateway 202 and presented to the intercept module 218. After intercepting the content, the intercept module 218 can provide the content to a translate module 220.

The translate module 220 is operable to translate the content posted by the user from one form to another. A social media site 106 may accept social media content in a certain language or protocol. This language may be translated by the translate module 220 to be acceptable by another social media site 106. For example, one social media network site 106a may accept HTML content while a second social media network site 106b may accept XML content. The translated module 220 can translate the HTML code to XML. There are several other languages, protocols, or other content-related information that can be changed by the translate module. For example, the translate module 220 is operable to change any of the metadata or parameters associated with the content that may be accepted by one or more social media networks 106.

The translated content may then be formatted by a format module 222. The format module 222 is operable to change the style or form of the content into something acceptable by another social media network site 106. For example, if a posting is a Facebook posting, the form may be a simple comment in the user's Facebook page. However, to place the content in YouTube, the format of the posting may need to be changed to a comment on or a response to a video in YouTube. Thus, the form may change to post the content to other social media networks. The format module 222 formats this information to send to the present module 224 to be presented in the social media network.

The present module 224 is operable to present the social media content to one or more social media networks 106. For example, if the user posts content to social media network site 106a, the present module 224 may present the content to social media networks 106b and 106c. To present the information to the other social media networks, the present module 224 may access user data in a user database 228 that allows the present module 224 to login or assume the identity of the user on the other social media network sites 106. Thus, by assuming the identity of the user, the present module 224 may post content amongst several different social media networks.

In other embodiments, the content may be directed to a certain user. The user posting the content may not have an account with the social media network upon which the present module 224 needs to present the content. However, the present module 224 may present the content on the other social media network site 106 in the page or as sent directly to the person that is to receive the content. For example, the user may post a comment to another user in a Facebook page. The present module 224 may wish to post the content into a MySpace page. However, the user that posted content may not have a MySpace account. However, the present module 224 may present the content to the other user in the other user's page by posting the content directly without logging in as the user. In some embodiments, the present module 224 may also present content to the user interface 226. Thus, if content is received from the social media gateway 202 is some form that is not easily presented, the present module 224 may present the information directly to a user's user interface 226, possibly as a pop-up window or other display. The present module 224 may provide the content to the social media gateway 202, which may then post the content to the different social media networks 106.

By posting content from one social media network site 106a to other social media networks 106b and/or 106c, the VPN engine 204 can create a VPN where each user may interact with each other using their own preferred social media site 106. In some embodiments, the VPN engine 204 may organize the users into VPN by obtaining data for each of the one or more users and storing it in a user database 228. When a user posts comment to any one of those users within the created VPN group, the VPN engine 204 may post the content to all the users in the VPN group. In embodiments, the user may select when to post information to the VPN group or to post information to a subset of all the members of the VPN group. An identifier for the VPN group may be created and associated with all members of the VPN group. As such, the user can post content to the VPN group, using the identifier to automatically post the content to all members of the VPN group.

Figure 3:
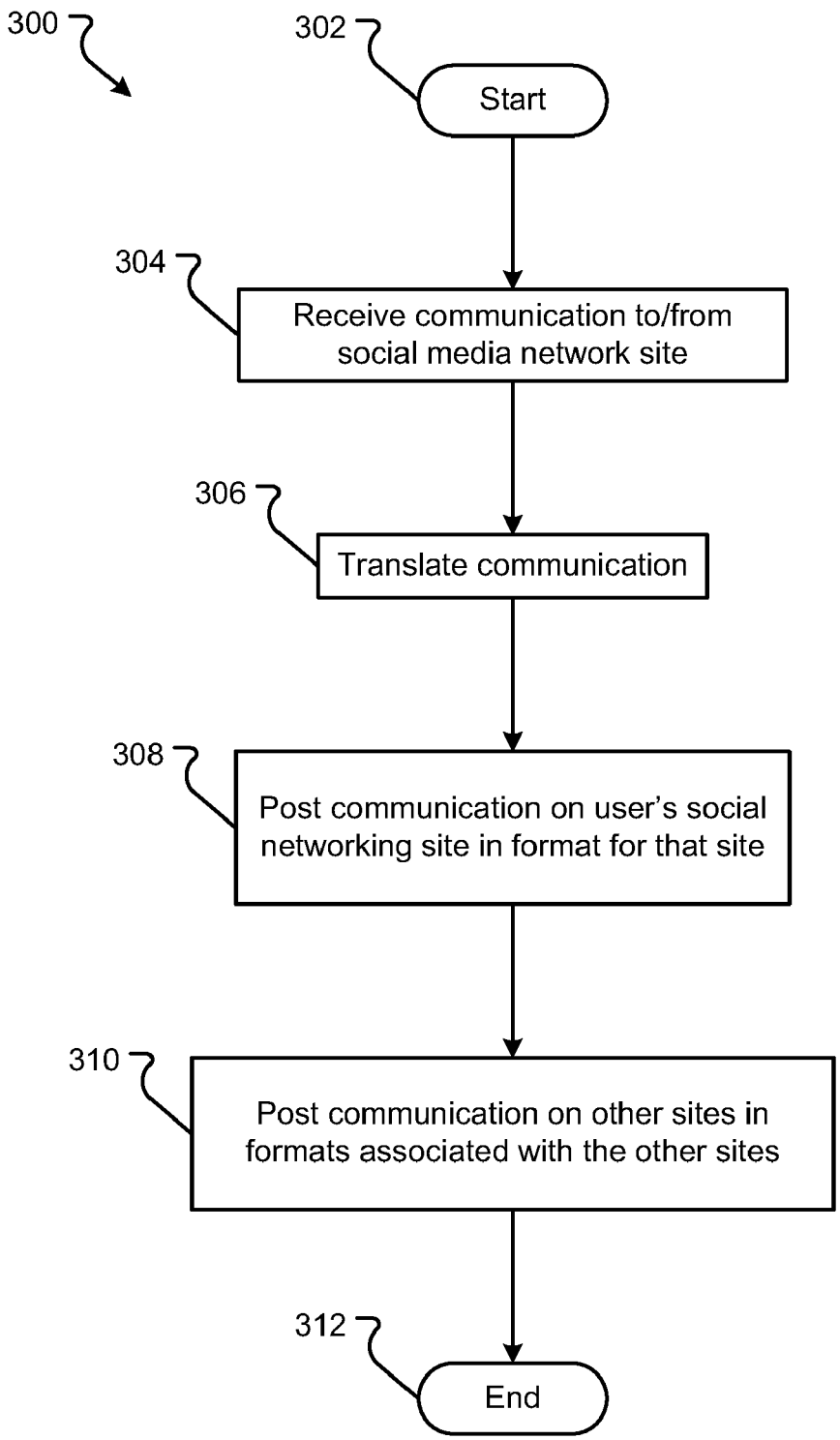
FIG. 3 is a flow diagram of an embodiment of a process for establishing a social media network VPN.

An embodiment of a method 300 for creating a VPN among users using different social media sites is shown in FIG. 3. Generally, the method 300 begins with a start operation 302 and terminates with an end operation 312. While a general order for the steps of the method 300 is shown in FIG. 3, the method 300 can include more or fewer steps or arrange the order of the steps differently than those shown in FIG. 3. The method 300 can be executed as a set of computer-executable instructions executed by a computer system and encoded or stored on a computer readable medium. Hereinafter, the method 300 shall be explained with reference to the systems, components, modules, data structures, user interfaces, etc. described in conjunction with FIGS. 1-2C.

The user computer 102 receives a communication to or from a social media network site 106, in step 304. A user may post a communication to a social media network site 106 in user computer 102. By providing the information to the user interface 226, the user can post content to a social media network site 106. The social media gateway 202 can intercept this communication to the social media network and provide that communication to the VPN engine 204. In other embodiments, the communication to one social media network site 106 from another user computer 102b can be read or retrieved by social media gateway 202 and provided to the VPN engine 204.

The VPN engine 204 can translate the communication to or from the social media network site 106, in step 306. The intercept module 218 may receive the communication from the social media gateway 202 and can provide the communication to a translate module 220. The translate module 220 can then translate the form of the content from that in which it was posted to other forms used by other social media network sites 106. For example, if the posting is to Facebook in social media site 106a, the translate module 220 may translate the content into a language or protocol used by MySpace which may be social media network site 106b. After translating the content, the translate module 220 may send the content to a format module 222, which can change the format of the content to adhere to the format used by a second social media network site 106b.

The translated and formatted content is received by the present module 224, which can post the communication on two or more social media network sites 106 in the format used by the social media network sites 106, in step 308. Here the present module 224 can present the content on a first social media network site 106a and a second social media network site 106b. In embodiments, the present module 224 sends two or more content postings to the social media gateway 202 to present the information through the social media gateway 202 to the social media networks 106. Thus, the first posting is made for social media network site 106a used by the user, in step 708. Then, the social media gateway 202 may post the communication on other social media network site 106b or 106c, in step 310.

Figure 4:
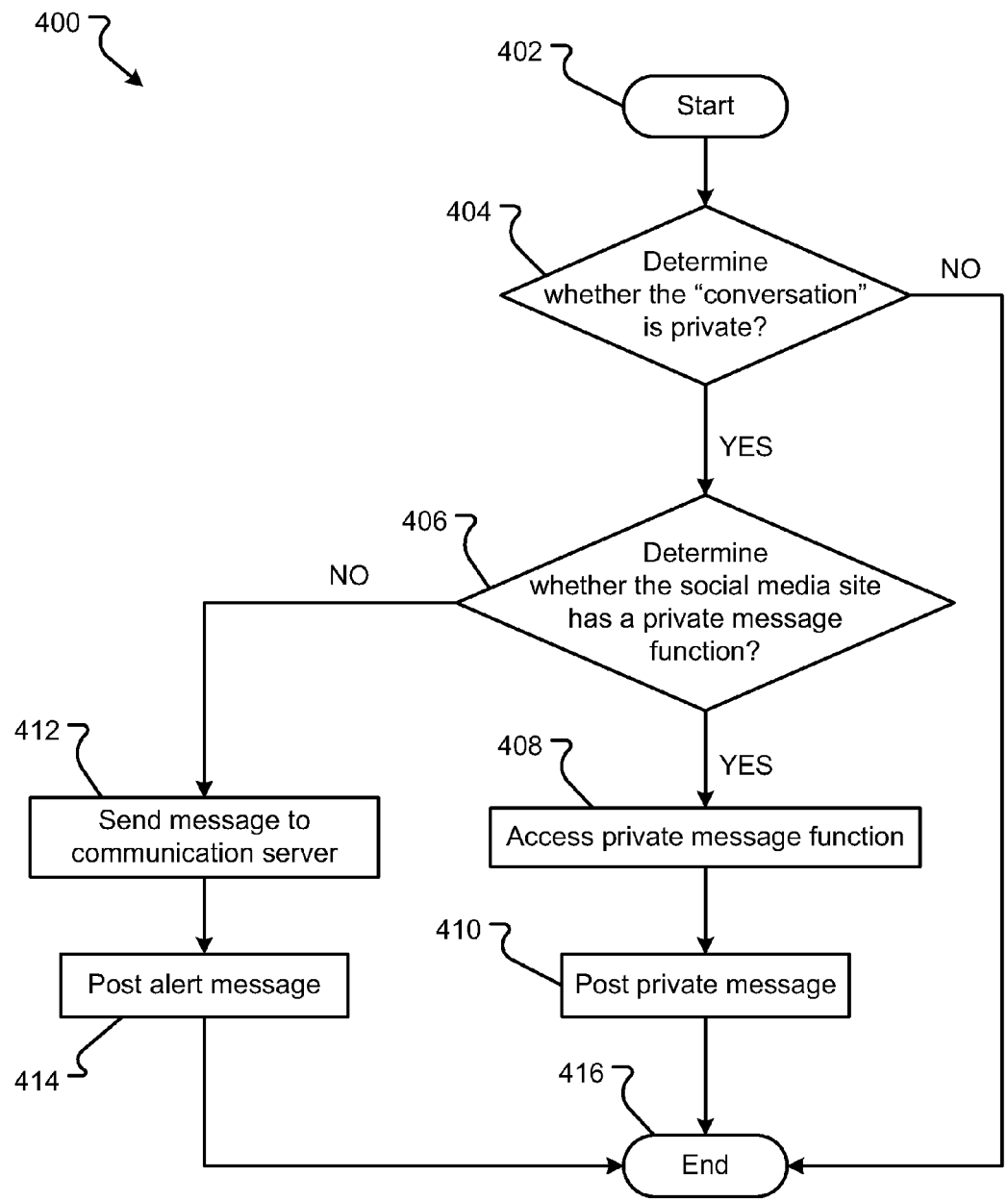
FIG. 4 is a flow diagram of an embodiment of a process for establishing a private social media network VPN.

An embodiment of a method 400 for making the social media network VPN private is shown in FIG. 4. Generally, the method 400 begins with a start operation 402 and terminates with an end operation 416. While a general order for the steps of the method 400 is shown in FIG. 4, the method 400 can include more or fewer steps or arrange the order of the steps differently than those shown in FIG. 4. The method 400 can be executed as a set of computer-executable instructions executed by a computer system and encoded or stored on a computer readable medium. Hereinafter, the method 400 shall be explained with reference to the systems, components, modules, data structures, user interfaces, etc. described in conjunction with FIGS. 1-2C. It should be noted that most social media network sites 106 post information publicly so that the postings are available to more than one user. However, many of these social media networks 106 provide a private messaging function that can allow two users to communicate privately. Thus, any social media posting only goes to one user.

The social network VPN engine 204 determines whether a conversation is private, in step 404. A conversation is a posting of two or more messages from two or more users. The conversation may be private if only those two or more users are involved in the conversation and no posting is made public. It should be noted that a private conversation may be conducted among any number of users and contain any number of postings. A user may mark a single conversation private or mark a VPN group as private. In either case, the VPN engine 204 can store an identifier with the conversation thread or with the VPN group designating the conversation or group as private. The privacy identifier may then be retrieved later to determine if a conversation is private. If a conversation is deemed private, step 404 proceeds "YES" to step 406. If the conversation is deemed not private, step 404 proceeds "NO" to end operation 416.

The VPN engine 204 may then determine whether the social media network site 106 is involved in the private conversation and/or has a private message function, in step 406. The VPN engine 204 can investigate the abilities of the social media network site 106 through the social media gateway 202 or, in embodiments, the VPN engine 204 accesses the social media parameters database 230 to determine the functionality of the social media network site 106. If the social media network site 106 includes a private message function, step 406 proceeds "YES" to step 408. If the social media site 106 does not include a private message function, step 406 proceeds "NO" to step 412.

In step 408, the VPN engine 204 accesses the private message function 408. In embodiments, the VPN engine 204 can access user database 228 to log on and set parameters for the user automatically. Thus, the content that was to be posted can be changed to a private message to the other user to which the content is directed. After these settings are established, to create a private message, the VPN engine 204 can post the private message, in step 410. As with public messages, the VPN engine 204 can post the private message to the social media gateway 202.

When there is no private message function, optionally, the VPN engine 204 may access the communication server 208 or some other function to send a private communication. The communication server 208 may be able to send email, instant messages, or other types of direct communications between the two or more users. Thus, the VPN engine 204 can send an email directly to the other person through the communication server 208, in step 412. In embodiments, the VPN engine 204 accesses user database 228 for the user to which the content is directed. The user data can include an email, instant message address, or some other address to send a communication. After determining where to send the message privately, the VPN engine 204 can post an alert message to the social media site in step 414. The alert message can alert the other user that content, which is a private, has been sent to the other user's email or other account and can provide notice as to which communication media the private message was sent. The message may then be sent through the communication server 208 to the other user. Thus, the user may determine from the social media site that a new email or instant message has been provided and can access that through message private means.

Figure 5:
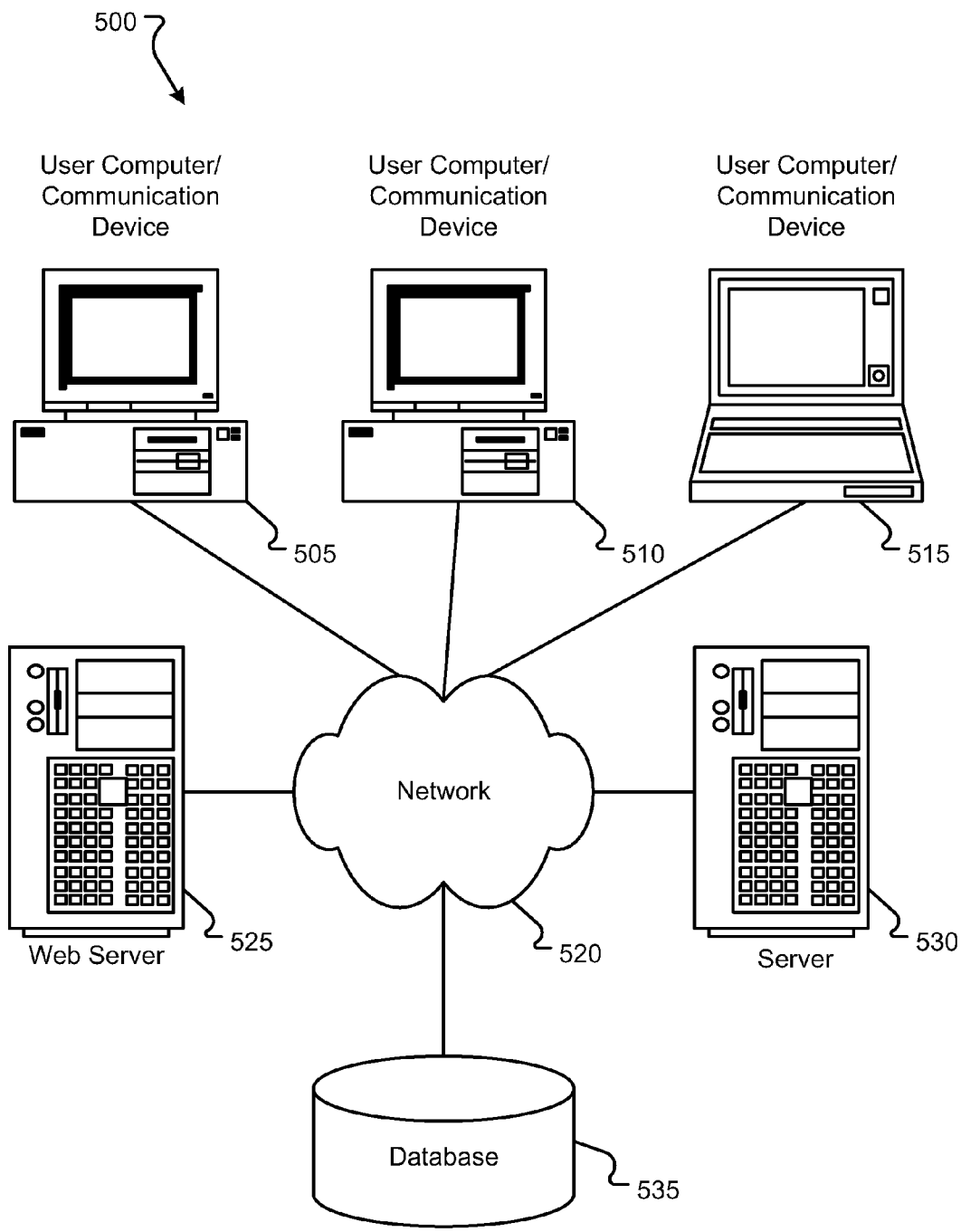
FIG. 5 is a block diagram of an embodiment of a computing environment operable to execute the embodiments described herein.

FIG. 5 illustrates a block diagram of a computing environment 500 that may function as system or environment for the embodiments described herein. The system 500 includes one or more user computers 505, 510, and 515. The user computers 505, 510, and 515 may be general purpose personal computers (including, merely by way of example, personal computers and/or laptop computers running various versions of Microsoft Corp.'s Windows™ and/or Apple Corp.'s Macintosh™ operating systems) and/or workstation computers running any of a variety of commercially-available UNIX™ or UNIX-like operating systems. These user computers 505, 510, 515 may also have any of a variety of applications, including for example, database client and/or server applications, and web browser applications. Alternatively, the user computers 505, 510, and 515 may be any other electronic device, such as a thin-client computer, Internet-enabled mobile telephone, and/or personal digital assistant, capable of communicating via a network (e.g., the network 520 described below) and/or displaying and navigating web pages or other types of electronic documents. Although the exemplary system 500 is shown with three user computers, any number of user computers may be supported.

System 500 further includes a network 520. The network 520 can be any type of network familiar to those skilled in the art that can support data communications using any of a variety of commercially-available protocols, including, without limitation, TCP/IP, SNA, IPX, AppleTalk, and the like. Merely by way of example, the network 520 maybe a local area network ("LAN"), such as an Ethernet network, a Token-Ring network and/or the like; a wide-area network; a virtual network, including without limitation a VPN ("VPN"); the Internet; an intranet; an extranet; a public switched telephone network ("PSTN"); an infra-red network; a wireless network (e.g., a network operating under any of the IEEE 802.11 suite of protocols, the Bluetooth™ protocol known in the art, and/or any other wireless protocol); and/or any combination of these and/or other networks.

The system 500 may also include one or more server computers 525, 530. One server may be a web server 525, which may be used to process requests for web pages or other electronic documents from user computers 505, 510, and 515. The web server can be running an operating system including any of those discussed above, as well as any commercially-available server operating systems. The web server 525 can also run a variety of server applications, including HTTP servers, FTP servers, CGI servers, database servers, Java servers, and the like. In some instances, the web server 525 may publish operations available operations as one or more web services.

The system 500 may also include one or more file and or/application servers 530, which can, in addition to an operating system, include one or more applications accessible by a client running on one or more of the user computers 505, 510, 515. The server(s) 530 may be one or more general purpose computers capable of executing programs or scripts in response to the user computers 505, 510 and 515. As one example, the server may execute one or more web applications. The web application may be implemented as one or more scripts or programs written in any programming language, such as Java™, C, C#™ or C++, and/or any scripting language, such as Perl, Python, or TCL, as well as combinations of any programming/scripting languages. The application server(s) 530 may also include database servers, including without limitation those commercially available from Oracle, Microsoft, Sybase™, IBM™ and the like, which can process requests from database clients running on a user computer 505.

The web pages created by the web application server 530 may be forwarded to a user computer 505 via a web server 525. Similarly, the web server 525 may be able to receive web page requests, web services invocations, and/or input data from a user computer 505 and can forward the web page requests and/or input data to the web application server 530. In further embodiments, the server 530 may function as a file server. Although for ease of description, FIG. 5 illustrates a separate web server 525 and file/application server 530, those skilled in the art will recognize that the functions described with respect to servers 525, 530 may be performed by a single server and/or a plurality of specialized servers, depending on implementation-specific needs and parameters. The computer systems 505, 510, and 515, file server 525 and/or application server 530 may function as servers or other systems described herein.

The system 500 may also include a database 535. The database 535 may reside in a variety of locations. By way of example, database 535 may reside on a storage medium local to (and/or resident in) one or more of the computers 505, 510, 515, 525, 530. Alternatively, it may be remote from any or all of the computers 505, 510, 515, 525, 530, and in communication (e.g., via the network 520) with one or more of these. In a particular set of embodiments, the database 535 may reside in a storage-area network ("SAN") familiar to those skilled in the art. Similarly, any necessary files for performing the functions attributed to the computers 505, 510, 515, 525, 530 may be stored locally on the respective computer and/or remotely, as appropriate. In one set of embodiments, the database 535 may be a relational database, such as Oracle 10i™, that is adapted to store, update, and retrieve data in response to SQL-formatted commands. Database 535 may be the same or similar to the database used herein.

Figure 6:
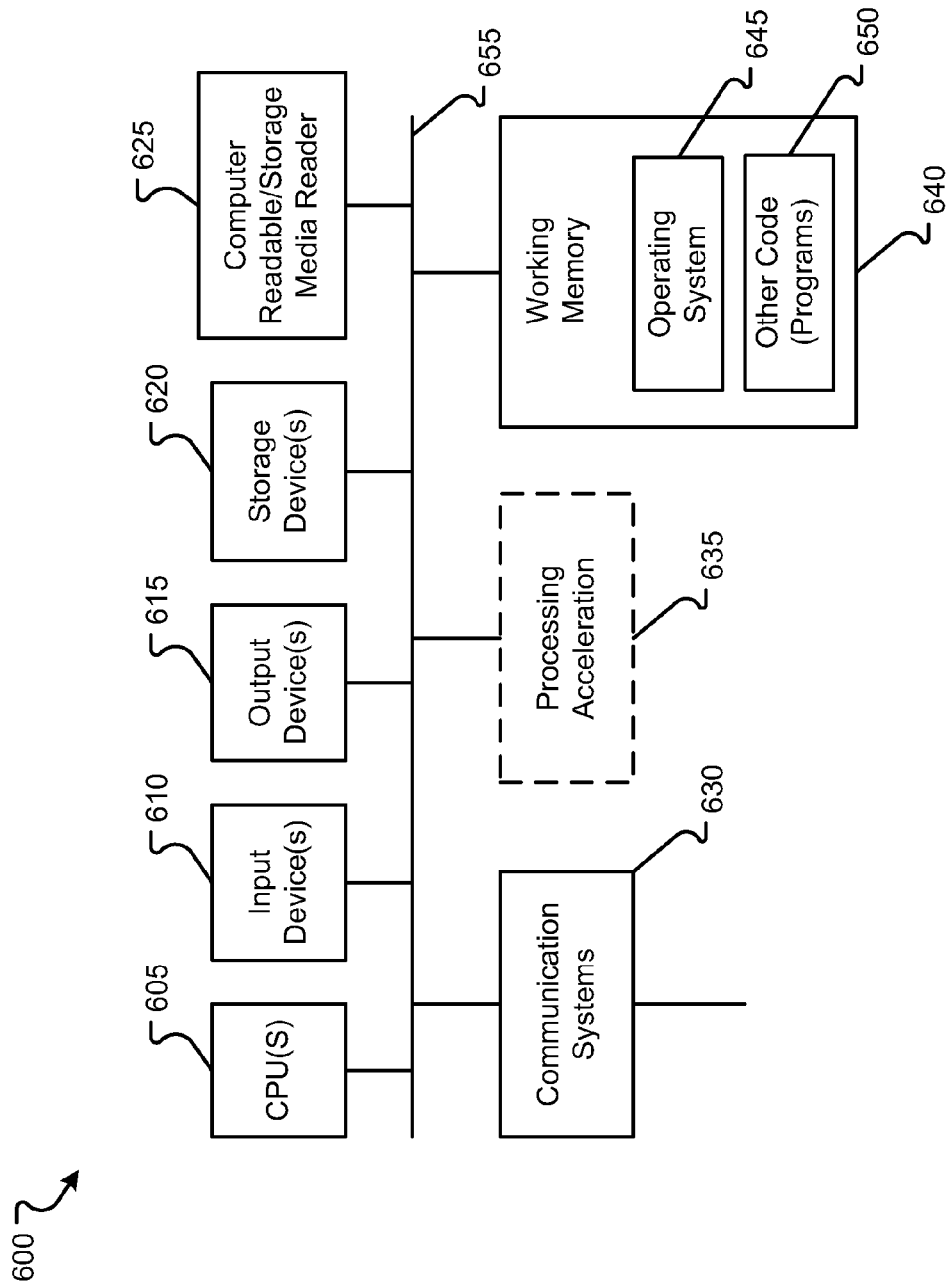
FIG. 6 is a block diagram of an embodiment of a computer or computing system environment operable to execute as the one or more devices described herein.

FIG. 6 illustrates one embodiment of a computer system 600 upon which servers or other systems described herein may be deployed or executed. The computer system 600 is shown comprising hardware elements that may be electrically coupled via a bus 655. The hardware elements may include one or more central processing units (CPUs) 605; one or more input devices 610 (e.g., a mouse, a keyboard, etc.); and one or more output devices 615 (e.g., a display device, a printer, etc.). The computer system 600 may also include one or more storage device 620. By way of example, storage device(s) 620 may be disk drives, optical storage devices, solid-state storage device such as a random access memory ("RAM") and/or a read-only memory ("ROM"), which can be programmable, flash-updateable and/or the like.

The computer system 600 may additionally include a computer-readable storage media reader 625; a communications system 630 (e.g., a modem, a network card (wireless or wired), an infra-red communication device, etc.); and working memory 640, which may include RAM and ROM devices as described above. In some embodiments, the computer system 600 may also include a processing acceleration unit 635, which can include a DSP, a special-purpose processor and/or the like.

The computer-readable storage media reader 625 can further be connected to a computer-readable storage medium, together (and, optionally, in combination with storage device(s) 620) comprehensively representing remote, local, fixed, and/or removable storage devices plus storage media for temporarily and/or more permanently containing computer-readable information. The communications system 630 may permit data to be exchanged with the network 620 and/or any other computer described above with respect to the system 600. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 600 may also comprise software elements, shown as being currently located within a working memory 640, including an operating system 645 and/or other code 650, such as program code implementing the servers or devices described herein. It should be appreciated that alternate embodiments of a computer system 600 may have numerous variations from that described above. For example, customized hardware might also be used and/or particular elements might be implemented in hardware, software (including portable software, such as applets), or both. Further, connection to other computing devices such as network input/output devices may be employed.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other types of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments have been described in detail herein, it is to be understood that the inventive concepts may be otherwise variously embodied and employed, and that the appended claims are intended to be construed to include such variations, except as limited by the prior art.

What is claimed is:

1. A computer program product including computer executable instructions stored onto a non-transitory computer readable medium which, when executed by a processor of a computer, causes the computer to perform a method for establishing a social media virtual private network (VPN), the instructions comprising:
    instructions to receive a communication, from a first user, directed to a first social media network site;
    instructions to post the communication to the first social media network site;
    instructions to post automatically the communication to a second social media network site for a second user;
    instructions to format the communication from a first format used by the first social media network site to a second format used by the second social media network site;
    instructions to determine if the communication is part of a private conversation;
    if the communication is part of a private conversation, instructions to post the communication as a private message on the first social media network site;
    instructions to retrieve information about the first user for the second social media network site;
    instructions to access a private message function for the second social media network site with the information about the first user; and
    instructions to post the private message with the private message function to the second social media site.

2. The computer program product as defined in claim 1, wherein the first user prefers the first social media network site.

3. The computer program product as defined in claim 2, wherein the second user prefers the second social media network site.

4. The computer program product as defined in claim 3, further comprising instructions to translate the communication from a first protocol used by the first social media network site to a second protocol used by the second social media network site.

5. A method for establishing a social media virtual private network (VPN), comprising:
    establishing, by a processor, a social media VPN group, wherein the VPN group includes two or more users that use two or more social media network sites to communicate content;
    receiving, by the processor, content for a first social media network site from a user in the VPN group;
    automatically posting, by the processor, the content to the first social media network site and to a second social media network site associated with the VPN group, wherein the VPN group is private;
    retrieving user information about the user in the VPN group;
    accessing a private message function for at least one of the two or more social media network sites with the user information;
    posting the content as a private message with the private message function for the at least one of the two or more social media network sites;
    retrieving information about the first user for the second social media network site;
    accessing a private message function for the second social media network site with the information about the first user; and
    posting the private message with the private message function for the second social media network site.

6. The method as defined in claim 5, wherein the two or more social media network sites includes, a blog, and a video blog.

7. The method as defined in claim 5, further comprising translating the content from a first protocol to a second protocol.

8. The method as defined in claim 7, further comprising formatting the content from a first format to a second format.

9. A system comprising:
    a memory,
    a processor in communication with the memory, the processor operable to execute software modules, the software modules comprising:
    a social media gateway operable to receive or post content to two or more social media network sites, post the content as a private message with a private message function for at least one of the two or more social media network sites, and post the private message with the private message function for a second social media network site; and
    a VPN engine in communication with the social media gateway, the VPN engine operable to:

create a VPN group including two or more users that post content to two or more social media network sites, wherein the VPN group is private;

intercept a communication, from a first user, directed to a first social media network site;

provide the communication to the social media gateway to post the communication to the first social media network site; and provide the communication to the social media gateway to post automatically the communication to the second social media network site for a second user;

retrieve user information about the first user;

access the private message function for the two or more social media network sites with the user information;

retrieve information about the first user for the second social media network site; and access a private message function for the second social media network site with the information about the first user.

10. The system as defined in claim 9, wherein the social media gateway comprises:

two or more social media network application programming interfaces (APIs) operable to receive content from or post content to two or more social media network sites; and a content filter in communication with the social media network API, the content filter operable to filter content from the social media network sites.

11. The system as defined in claim 9, wherein the VPN engine comprises:

an intercept module operable to intercept the communication to be posted to the first social media network site;

a translate module operable to translate the communication from a first protocol to a second protocol;

a format module operable to format the communication from a first format to a second format; and a present module operable to present the communication to the social media gateway for posting.

12. The system as defined in claim 9, wherein the VPN engine communicates with a user database that stores information about two or more users in the VPN group.

13. The system as defined in claim 9, wherein the VPN engine communicates with a social media parameters database that stores information about the two or more social media network site used in the VPN group.

14. A computer program product including computer executable instructions stored onto a non-transitory computer readable medium which, when executed by a processor of a computer, causes the computer to perform a method for establishing a social media virtual private network (VPN), the instructions comprising:

instructions to receive a communication, from a first user, directed to a first social media network site;

instructions to post the communication to the first social media network site;

instructions to post automatically the communication to a second social media network site for a second user;

instructions to format the communication from a first format used by the first social media network site to a second format used by the second social media network site;

instructions to determine if the communication is part of a private conversation;

if the communication is part of a private conversation, instructions to post the communication as a private message;

instructions to determine if the second social media network site has a private message function;

if the second social media network site does not have a private message function;

instructions to access a communication server to send the private message; and instructions to, instead of automatically posting the communication to the second social media network, send the private message through the communication server.

15. The computer program product as defined in claim 14, wherein the private message is one of an email or instant message from the first user to the second user.

* * * * *